United States Patent
Iroaga et al.

(10) Patent No.: US 6,594,101 B1
(45) Date of Patent: Jul. 15, 2003

(54) READ HEAD PROTECTION CIRCUIT AND METHOD

(75) Inventors: Echere Iroaga, Garland, TX (US); Bryan E. Bloodworth, Irving, TX (US); Ashish Manjrekar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 411 days.

(21) Appl. No.: 09/599,474

(22) Filed: Jun. 22, 2000

(51) Int. Cl.[7] ............................ G11B 5/02; G11B 5/09
(52) U.S. Cl. ................ 360/67; 360/46; 360/61; 360/63; 360/53; 360/66
(58) Field of Search ......................... 360/1–68; 369/33

(56) References Cited

U.S. PATENT DOCUMENTS 6,118,611 A * 9/2000 Shibasaki et al. ............. 360/67
6,388,830 B1 * 5/2002 Matousek et al. ............. 360/63
6,469,854 B1 * 10/2002 Gill et al. ..................... 360/53
2001/0015867 A1 * 8/2001 Hatanaka et al. ............. 360/67

* cited by examiner

Primary Examiner—Richemond Dorvil
Assistant Examiner—Glenda Rodriguez
(74) Attorney, Agent, or Firm—W. Daniel Swayze, Jr.; W. James Brady; Frederick J. Telecky, Jr.

(57) ABSTRACT

A circuit (80) and method (84) for protecting read heads (18) of a hard-disk drive system (100). Capacitor $C_1$ is controllably coupled to a dummy head $R_{dummy}$ during a $V_{bias}$ mode, so that capacitor $C_1$ has a low, predictable voltage upon returning to $I_{bias}$ mode, protecting the read heads (18) from damage. The circuit (80) includes logic (82) and algorithm (84) determining when to couple the capacitor C1 to the dummy head $R_{dummy}$ during a servo bank write (SBW) sequence.

20 Claims, 3 Drawing Sheets

READ HEAD PROTECTION CIRCUIT AND METHOD

TECHNICAL FIELD

This invention relates generally to the field of information storage, and more particularly to a circuit and method for protecting read heads of a hard-disk drive.

BACKGROUND OF THE INVENTION

Hard-disk drives are mass storage devices that typically include a magnetic storage media, e.g. rotating disks or platters, a spindle motor, read/write heads, an actuator, a pre-amplifier, a read channel, a write channel, a servo circuit, and control circuitry to control the operation of hard-disk drive and to properly interface the hard-disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a rotatable base 14. The platters 12 are used to store data that is represented as magnetic transitions on the magnetic platters, with each platter 12 coupleable to the read/write heads 18/20 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platter 12 by the read head 18 and a write head 20. The read head comprise of magneto-resistive heads, adapted to read data from or to platters 12, when current is passed through them. Read/write heads 18/20 are coupled to preamplifier 26 that serves as an interface between read/write heads 18/20 of disk/head assembly 10 and SSD channel 28. The preamp 26 provides amplification to the waveform data signals as needed. The platter 12 surfaces are partitioned and formatted into sections as shown, with data storage wedges or sections 22 comprising the majority of the platter surface area, and smaller servo wedges 24 positioned therebetween storing positional information. At specified time intervals during the normal operation of the hard-disk drive system 10, a sequence called a Servo Bank Write (SBW) sequence is performed during which the write heads 20 write positional data to all of the platter servo wedges 24 simultaneously.

A problem with prior art hard-disk drive designs is the extreme sensitivity of the read heads 18. When data is being written to platter(s) 12 with write head 20, a large amount of current, e.g. 40 mA is placed through the write head 20, which may be coupled back into the read head 18 proximate with write head 20, possibly damaging or blowing read head 18. To prevent damage during a write sequence, most prior art designs apply a bias to read head 18. The risk of read head 18 damage is particularly high during a SBW sequence because all read heads 18 are on simultaneously and thus the bias current is divided equally between the read heads 18, resulting in the bias current applied to each read head 18 being dependent on the number of read heads 18 connected to the preamp 26. This relationship is characterized in Equation 1:

Eq. 1:

$$Ib_{head} = \frac{I_{biastotal}}{N}$$

where $I_{biastotal}$ is the total bias current applied from the preamplifier 26 to all heads 18/20, $Ib_{head}$ is the bias current on one read head 18, and N is the number of heads in the hard-disk drive system 10, with N being three in the system 10 shown in FIG. 1. Thus, in transitioning to SBW mode, the bias current on a read head 18 can potentially drop from $I_{biastotal}$ in the read mode to $I_{biastotal}/N$ in SBW mode. The decreased bias current may be insufficient to protect read head 18, resulting in damage to the head 18.

What is needed is a circuit and method for protecting read heads 18 during a hard-disk drive SBW sequence.

SUMMARY OF THE INVENTION

The present invention achieves technical advantages as a circuit and method for protecting read heads of a disk drive during a SBW sequence. A feedback loop capacitor of a preamp is controllably coupled to a separate dummy head during a $V_{bias}$ mode so the capacitor voltage is both predictable and lower than the voltage of the read head when returning to an $I_{bias}$ mode.

The invention comprises a circuit for protecting a read head of a hard-disk drive, comprising a voltage bias circuit selectively coupleable to the read head, a capacitor selectively coupleable to the read head and a dummy head selectively coupleable to the capacitor. The dummy head may comprise an internal resistor. The capacitor is controllably and responsively coupled to the dummy head when the voltage bias circuit is coupled to the read head to prevent coupling a damaging level of current to the read head.

The invention includes a preamplifier for a hard-disk drive storage system having a plurality of platters for storing data and a read head for each the platter for retrieving the data. The preamplifier comprises a read head protection circuit having a voltage bias circuit coupleable to the read head, a capacitor coupleable to the read head and a dummy head coupleable to the capacitor. The capacitor is controllably coupled to the dummy head when the voltage bias circuit is coupled to the read head.

A method of the invention includes protecting a read head of a hard-disk drive storage system, the system comprising a preamplifier circuit having a voltage bias circuit and a capacitor coupleable to the read head, and a dummy head selectively coupleable to the capacitor. The method protects the read head by controllably discharging the capacitor voltage through the dummy head when the voltage bias circuit is coupled to the read head to prevent coupling a damaging level of current to the read head.

Advantages of the invention include protecting read heads 18 of a hard-disk drive system during a servo bank write (SBW) sequence when all of the write heads 20 are in use. The protection circuit and method are an easily implementable and dependable solution protecting read heads from being damaged during the SBW sequence. Preferably, the dummy head resistor discharges the capacitor to a predetermined voltage, rather than leaving the capacitor floating as in the prior art. The voltage is predictable and allows the storage system to remain in the $V_{bias}$ mode for a longer amount of time as compared to the prior art. In some circuits, the present invention only requires an additional switch coupling the capacitor to a dummy head of the $V_{bias}$ circuit.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Figure 1:
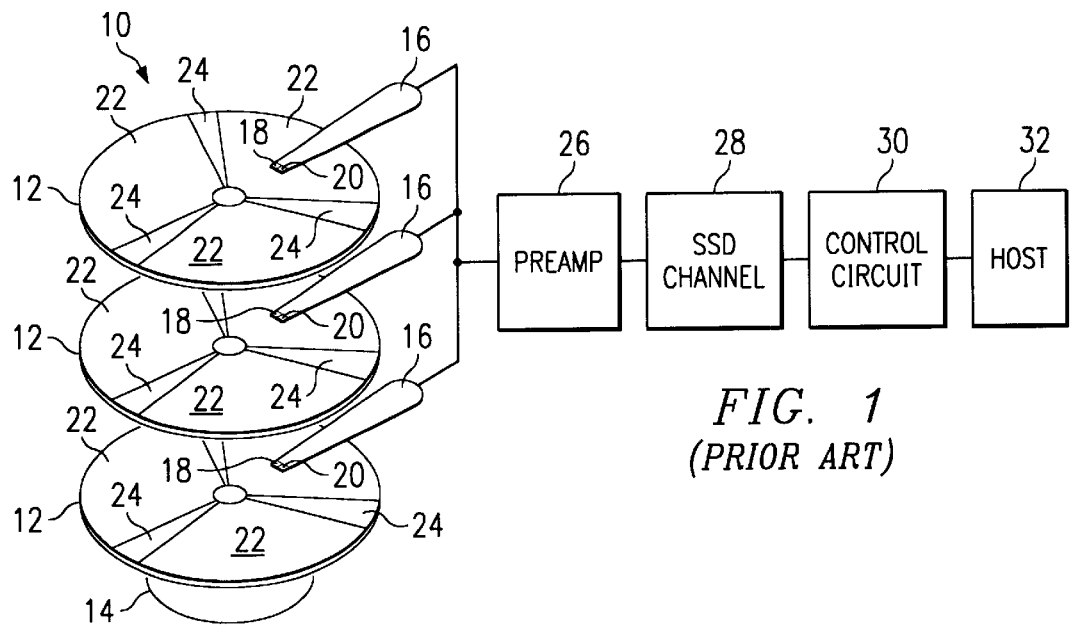
FIG. 1 illustrates a configuration of a prior art disk drive mass storage system.
Figure 2:
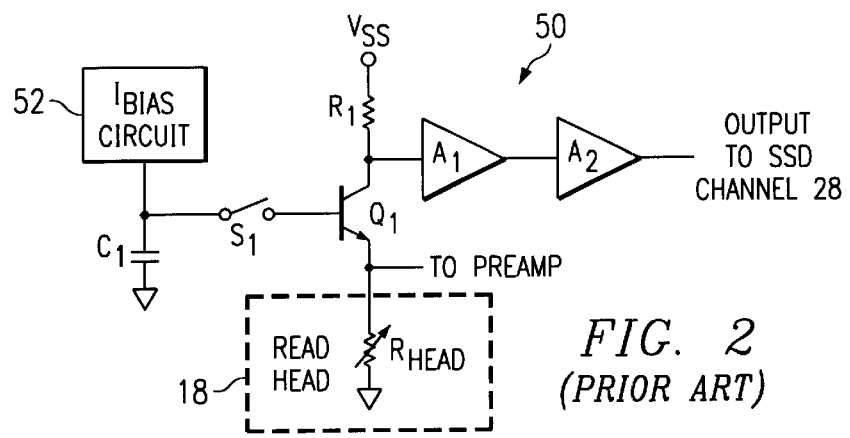
FIG. 2 is a schematic representation of a typical prior art circuit used to bias a read head with a current $I_{bias}$.

FIG. 2 is a schematic diagram of a prior art control circuit 50, usually comprising part of the preamp 26 of FIG. 1, having a current bias $I_{bias}$ circuit 52 coupled via switch S1 to the read head 18 of hard-disk drive system 10. Transistor $Q_1$ may comprise an NPN bipolar transistor coupled to voltage supply Vss by a current limiting resistor $R_1$. The transistor $Q_1$ controls a signal passed through gain stages A1 and A2 to provide an output voltage to SSD channel 28. During an $I_{bias}$ mode, switch $S_1$ is closed, coupling $I_{bias}$ circuit 52 to $C_1$ and also to read head 18, represented by resistor $R_{head}$ via transistor $Q_1$. Other read heads may be similarly configured in the circuit 50, not shown, for each platter 12 of the disk drive system 10. In the $I_{bias}$ mode, a small amount of current is passed through resistor $R_{head}$ to protect the read head 18 while the write heads 20 are in use.

Preamp 26 comprises a single current source (not shown) for supplying current to read heads 18 one at a time to prevent interference between the read heads, in a multiplexed fashion. However, during a SBW sequence in the $I_{bias}$ mode, $I_{bias}$ circuit 52 is coupled to all read heads 18 simultaneously rather than being coupled to only one read head 18 at a time, as in a normal operating mode. Therefore, during a SBW sequence, the $I_{bias}$ circuit 52 single source current is shared among all read heads 18. The problem is exacerbated as the number of platters 12 increase in the hard-disk drive system 10. For example, for a two platter system, the $I_{bias}$ current is halved for each read head 18. For a four platter system, the $I_{bias}$ current is 25% for each read head 18 as compared to a single head $I_{bias}$ mode. A problem with the $I_{bias}$ circuit of FIG. 2 is that during the SBW sequence, for two or more platters 12, the $I_{bias}$ circuit 52 current may not be sufficient to protect the read heads 18 from being damaged during the SBW sequence. For example, if $I_{bias}$ circuit 52 is adapted to supply 5 mA, this current may be adequate to protect one read head 18, but splitting the 5 mA current during a SBW sequence for a two-platter system results in a 2.5 mA current flowing through each read head 18, which current may not be adequate protection. The protection circuit 50 is also disadvantageous because the amount of bias current is variable and dependant on the number of platters 12 in the disk drive system 10. Ideally, the bias current would be independent of number of heads 18 in the disk drive so that the bias current on a single head remains constant when transitioning going from the read mode to SBW mode, preventing damage read heads 18.

Figure 3:
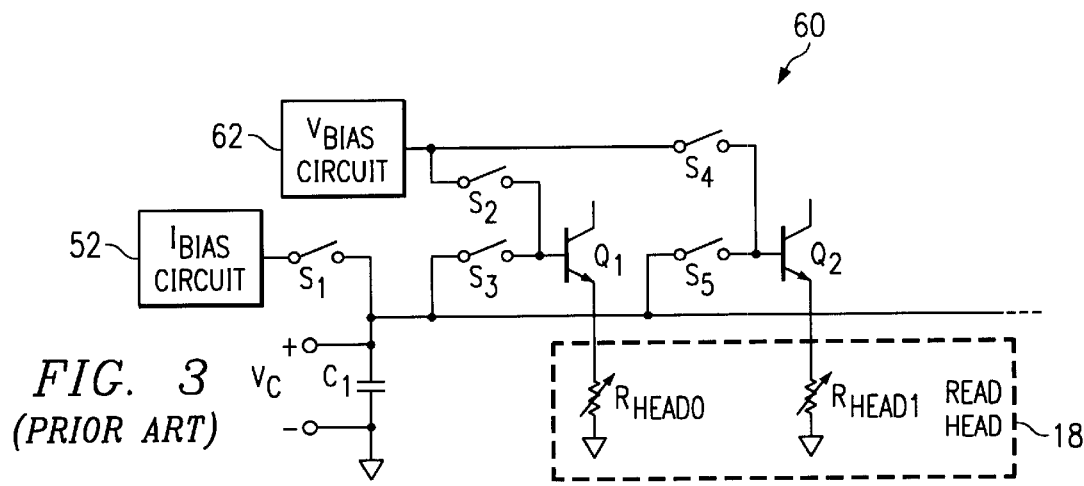
FIG. 3 is a schematic representation of an alternative prior art method of biasing the read head alternately with a voltage $V_{bias}$ circuit and an $I_{bias}$ circuit.

Another prior art method and circuit for biasing read heads 18 when write heads 20 are in use is shown in the circuit 60 of FIG. 3. A voltage bias $V_{bias}$ circuit 62 is coupled to read heads 18 via switches $S_2$ and $S_4$ to protect the read heads 18 when the write heads 20 are in use. $V_{bias}$ may be set by the system designer upon startup by a serial port register (not shown). $V_{bias}$ circuit 62 provides the same amount of bias voltage to the read heads 18 regardless of the number of platters 12 in the system 10.

In typical system architectures the preamps 26 are designed to require a feedback loop adapted for $I_{bias}$ circuitry. Before activating the $V_{bias}$ circuit 62, the $I_{bias}$ circuit 52 must be turned off which is accomplished by opening switch $S_1$. This presents a problem in circuit 60 because feedback loop capacitor $C_1$ is allowed to float during the $V_{bias}$ mode, resulting in an unpredictable amount of voltage $V_c$ on the capacitor $C_1$. When switch $S_1$ is closed again, coupling voltage $V_c$ on $C_1$ to read heads 18, voltage $V_c$ may have drifted to a high voltage, damaging read heads 18. In particular, a SBW sequence can be lengthy, allowing ample time for leakage currents to build up an excessive charge on capacitor $C_1$ that can damage read heads 18.

Figure 4:
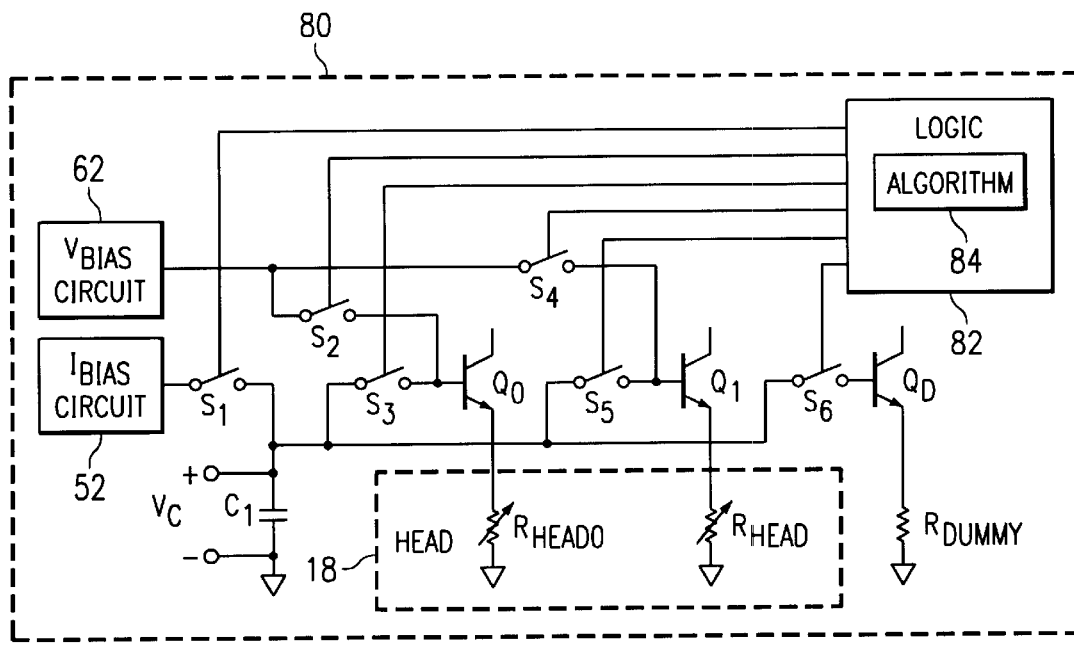
FIG. 4 is a schematic diagram illustrating a preferred embodiment of the present invention having a dummy head $R_{dummy}$ that is selectively coupled to capacitor $C_1$ during the $V_{bias}$ mode, when the read heads are not in use.

FIG. 4 is a schematic diagram of circuit 80 showing an exemplary embodiment of the best mode of the present invention. $V_{bias}$ circuit 62 and $I_{bias}$ circuit 52 are alternatingly coupled to read heads 18 of the hard-disk drive system. A dummy head, represented by resistor $R_{dummy}$, is controllably and responsively coupled to capacitor $C_1$ when the $V_{bias}$ circuit 62 is not coupled to the read heads 18, ensuring that the capacitor voltage $V_c$ is dissipated to a predetermined voltage being lower than the $V_{bias}$ circuit 62. When read heads 18 are then switched over to the $V_{bias}$ circuit 62 during the SBW sequence, for example, voltage $V_c$ will not be sufficient to damage the heads 18 because dummy resistor $R_{dummy}$ previously discharged the capacitor $C_1$. Logic circuit 82 comprises a SBW protection algorithm 84, the logic 82 being coupled to and controlling switches $S_1$, $S_2$, $S_3$, $S_4$, $S_5$ and $S_6$. According to the present invention, when the system is in a SBW sequence, switch S6 is responsively closed, coupling dummy head $R_{dummy}$ to capacitor $C_1$ via transistor $Q_D$ and ensuring that voltage $V_c$ is at a lower voltage level than the voltage on the read heads depicted as $R_{head0}$ and $R_{head1}$ (and other heads for a system having more than two platters, not shown) when the system switches out of SBW sequence.

Preferably, dummy head $R_{dummy}$ resides in a preamp circuit 102 (FIG. 7), e.g. the preamp 102 may comprise a separate integrated circuit including dummy head $R_{dummy}$. Dummy head $R_{dummy}$ preferably comprises a resistance equal to 10–30% of the lowest read head 18 resistance. For example, if the resistance of read heads 18 of the a disk drive system is 30 to 80 ohms, the dummy head preferably comprises a resistor $R_{dummy}$ having a resistance value of 10 to 14 ohms. Because the resistance of resistor $R_{dummy}$ is lower than the resistance of the read heads 18, coupling resistor $R_{dummy}$ to capacitor $C_1$ via transistor $Q_D$ ensures that voltage $V_c$ is lower than the read head voltage, preventing damage to the head when the read head 18 is switched back to being coupled to capacitor $C_1$ via the respective transistor. $V_{bias}$ circuit 62 may be coupled to read heads 18 alternatively with $I_{bias}$ circuit 52 to bias the read heads 18 in various sequences or modes of the hard drive system. Capacitor $C_1$ is discharged through dummy resistor $R_{dummy}$ during SBW sequences to prevent damage to read heads 18.

Figure 7:
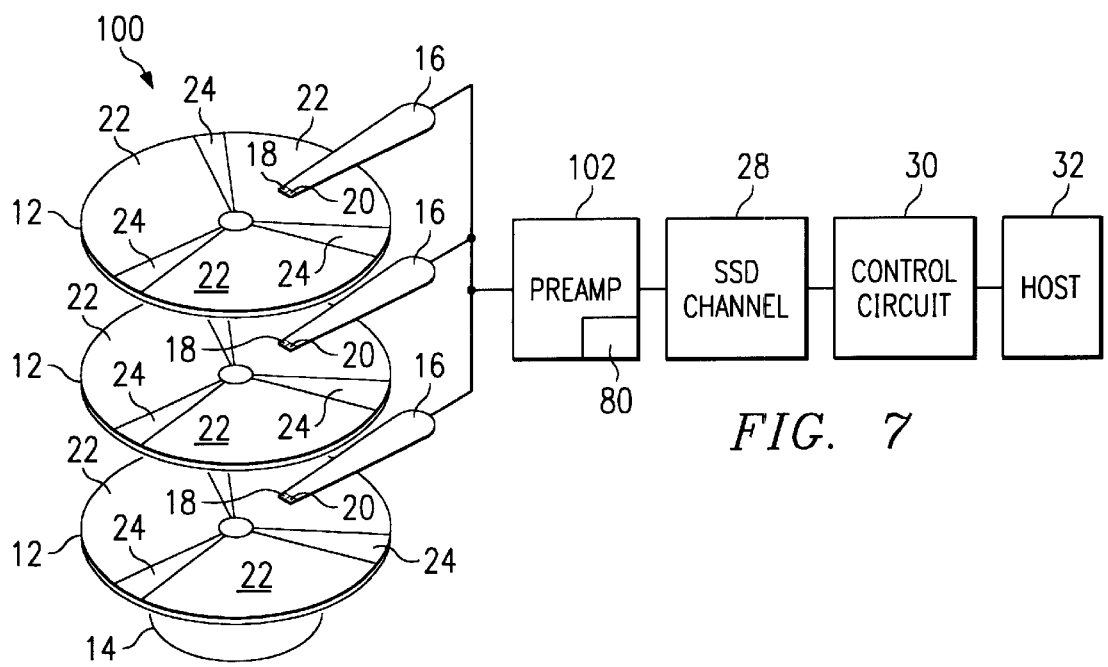
FIG. 7 shows a block diagram of the present invention implemented in a hard-disk drive system.

The novel circuit 80 advantageously provides predictability of the voltage Vc across capacitor $C_1$ so the circuit can be optimized for recovery of voltage Vc after a SBW sequence. For example, if a dummy resistor $R_{dummy}$ is used that will produce a voltage Vc of 0.3 V during SBW, and the read head 18 voltage is 0.5 V, the voltage recovery required is 0.2 V. This recovery voltage is useful to determine recovery time information useful in the design of the hard-disk drive system 100 (FIG. 7).

Figure 5:
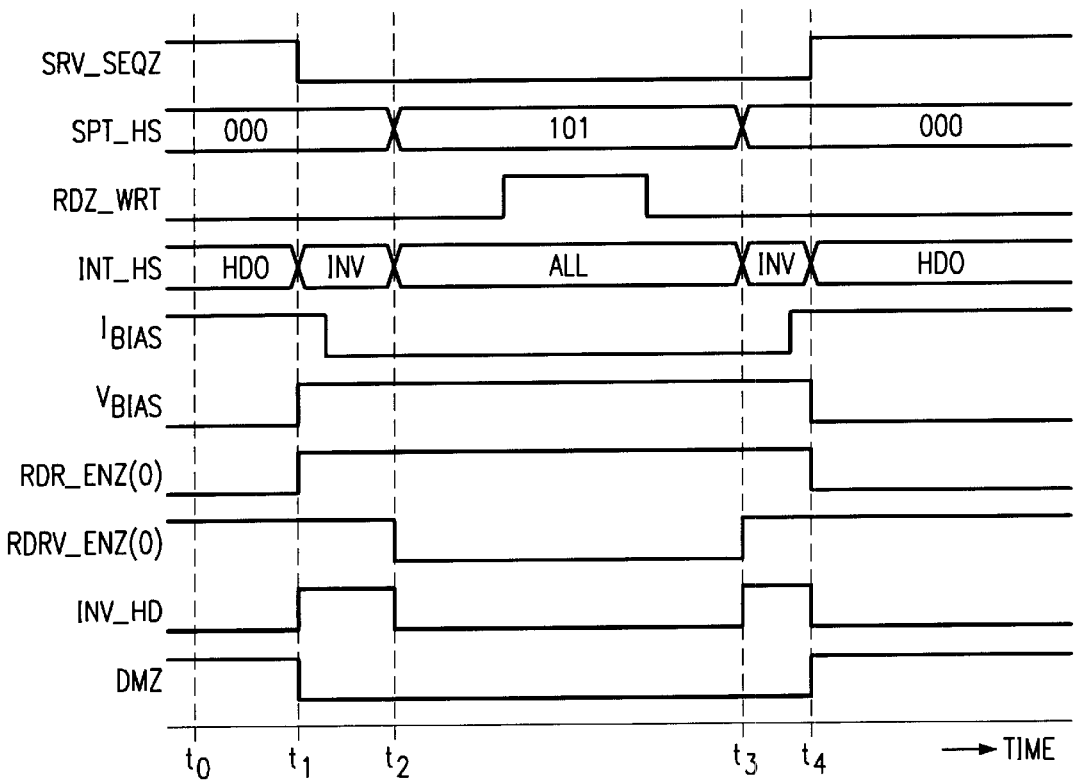
FIG. 5 illustrates a timing diagram of the circuit shown in FIG. 5.

FIG. 5 shows a timing diagram for a first head $R_{head0}$ (FIG. 4) of the hard-disk drive system 100 (FIG. 7) having four heads. A serial port head select signal SPT_HS indicates the head selected, e.g. binary 000 selects the first head, and binary 101 selects all four heads. Initially, the disk drive system 100 is in a regular read mode at time $t_0$. Signal RDZ_WRT indicates the read mode when a logic low, and the write mode when logic high. The servo signal SRV_SEQZ is switched low at time $t_1$ to indicate that a servo bank write (SBW) sequence will be started. Signals $I_{bias}$ and $V_{bias}$ select the $I_{bias}$ and $V_{bias}$ mode, respectively, for the first head $R_{head0}$ of FIG. 4 via switches S1, S2 and S3, for example.

At time $t_1$ the $V_{bias}$ mode is activated for read head $R_{head0}$ with signal $V_{bias}$ going high, and the dummy resistor $R_{dummy}$ is coupled to capacitor $C_1$, indicated by signal DMZ, which controls the dummy head resistor $R_{dummy}$. In response, internal head select signal INT_HS registers an invalid head state of binary 101 at time $t_1$. Signal INT_HS corresponds to the serial port head select signal SPT_HS and changes state at time $t_2$. The circuit has determined internally that it is now in the SBW mode. In prior art circuits, capacitor $C_1$ would be floating at time $t_1$. However, in accordance with the present invention the serial port register signal SPT_HS is decoded to prevent the capacitor $C_1$ from floating by being coupled via switch $S_6$ and transister $Q_D$ to the dummy head $R_{dummy}$. When signal SPT_HS reverses at time $t_3$, signal INT_HS responds. The dummy head $R_{dummy}$ is disconnected from capacitor $C_1$ shown at signal DMZ at time $t_4$ when the SRV_SEQZ goes high signaling the end of the SBW mode and the switching off of $V_{bias}$.

Figure 6:
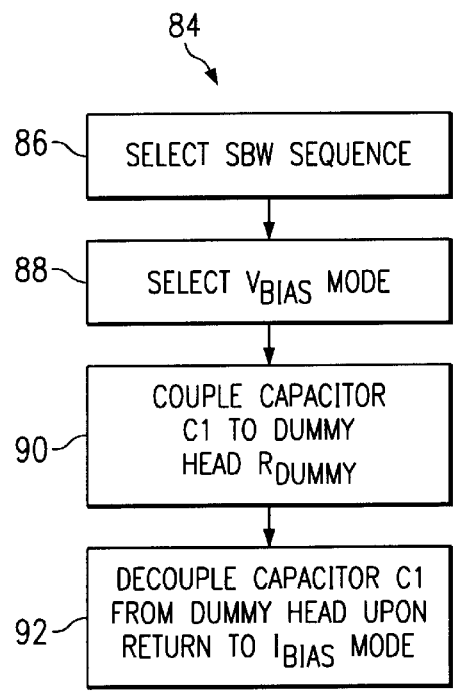
FIG. 6 is a flow chart of an algorithm of the present invention.

FIG. 6 shows an algorithm 84 in accordance with the present invention. When a SBW sequence is begun (step 86), the $V_{bias}$ mode is selected (step 88). Capacitor $C_1$ is coupled to dummy head $R_{dummy}$ (step 90) until the circuit exits the SBW mode and returns to the $I_{bias}$ mode, at which time capacitor $C_1$ is decoupled from the dummy head $R_{dummy}$ (step 92) and coupled to the selected read head 18.

FIG. 7 illustrates a hard-disk drive system 100 comprising the preamp 102 of the present invention including protection circuitry 80 that functions in accordance with algorithm 84. The preamp 102 preferably comprises a single integrated circuit chip, and may be positioned on one or more arms 16 of the disk drive system 100.

The novel protection circuit and method of the present invention achieves technical advantages by protecting read heads 18 of a hard-disk drive system during a servo bank write (SBW) sequence when all of the write heads 20 are in use. The protection circuit and method described herein provides an easily implementable and dependable method of protecting read heads 18 from being damaged during the SBW sequence. The dummy head resistor $R_{dummy}$ controls the voltage Vc to which capacitor $C_1$ is discharged, rather than leaving the capacitor $C_1$ floating as in the prior art. The voltage $V_c$ is predictable and established to allow the $V_{bias}$ to be applied for a longer amount of time as compared to the prior art.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for protecting a read head of a hard-disk drive, comprising:
    a voltage bias circuit coupleable to the read head;
    a capacitor coupleable to the read head;
    a dummy head coupleable to said capacitor, wherein said capacitor is coupled to said dummy head when said voltage bias circuit is coupled to the read head; and
    said capacitor is coupled to said read head when said voltage bias circuit is not coupled to the read head.

2. The circuit according to claim 1 wherein said dummy head lowers a voltage across said capacitor.

3. The circuit according to claim 2 further comprising:
    a current bias circuit coupleable to the read head and said capacitor.

4. The circuit according to claim 2 wherein the hard-disk drive comprises a write head, the write head and the read head being alternatingly selectable, wherein said dummy head lowers the voltage across said capacitor to a voltage lower than a voltage of the read head when the write head is selected.

5. The circuit according to claim 3 further comprising:
    logic circuitry controllably coupling said dummy head to said capacitor; and
    an algorithm controlling said logic circuitry.

6. The circuit according to claim 1 wherein the hard-disk drive comprises a plurality of read and write heads adapted to read and write to/from a storage medium, wherein during a servo bank write (SBW) sequence, all the write heads write to said storage medium simultaneously, wherein said dummy head is coupled to said capacitor during said SBW sequence.

7. The circuit according to claim 1 wherein said dummy head comprises a resistor having a resistance value less than a resistance of said read head.

8. The circuit according to claim 7 wherein said dummy head resistor value is 10–30% less than said read head resistance value.

9. A preamplifier for a hard-disk drive storage system having a plurality of platters for storing data and a read head for each said platter for retrieving said data, said preamplifier comprising:
    a read head protection circuit, said read head protection circuit including a voltage bias circuit coupleable to the read head, a capacitor coupleable to the read head and a dummy head coupleable to said capacitor, wherein said capacitor is coupled to said dummy head when said voltage bias circuit is coupled to the read head; and
    said capacitor is coupled to said read head when said voltage bias circuit is not coupled to the read head.

10. The preamplifier according to claim 9 wherein said dummy head lowers a voltage across said capacitor.

11. The preamplifier according to claim 10 wherein said read head protection circuit further comprises:
   a current bias circuit coupleable to the read head and said capacitor.

12. The preamplifier according to claim 10 wherein the hard-disk drive comprises a write head, the write head and the read head being alternatingly selectable, wherein said dummy head lowers the voltage across said capacitor to a voltage lower than a voltage of the read head when the write head is selected.

13. The preamplifier according to claim 11 wherein said read head protection circuit further comprises:
   logic circuitry controlling the coupling of said dummy head to said capacitor; and
   an algorithm controlling said logic circuitry.

14. The preamplifier according to claim 9 wherein the hard-disk drive comprises a plurality of write heads adapted to write data to/from said platters, wherein during a servo bank write (SBW) sequence, all the write heads write to said platters simultaneously, wherein said preamplifier dummy head is coupled to said capacitor during said SBW sequence.

15. The preamplifier according to claim 9 wherein said dummy head comprises a resistor having a resistance value less than a resistance of said read head.

16. The preamplifier according to claim 15 wherein said dummy head resistor value is 10–30% less than said read head resistance value.

17. A method of protecting a read head of a hard-disk drive storage system, said system comprising a preamplifier circuit having a voltage bias circuit and a capacitor coupleable to said read head, and a dummy head coupleable to said capacitor, said method comprising the step of:
   discharging said capacitor through said dummy head when said voltage bias circuit is coupled to said read head; and
   coupling said capacitor and read head when said voltage bias circuit is not coupled to said read head.

18. The method according to claim 17 wherein said discharging step comprises discharging said capacitor through a resistor having a resistance value less than a resistance value of said read head.

19. The method according to claim 18 wherein said hard-disk drive comprises a write head, said write head and said read head being alternatingly selectable, further comprising the step of:
   when said write head is selected, discharging said capacitor so the capacitor voltage is lower than the voltage of said read head.

20. The method according to claim 19, wherein said disk drive system comprises a plurality of said read and write heads, wherein all said write heads are adapted to write to a plurality of platters simultaneously during a Servo Bank Write (SBW) sequence, wherein said discharging step is performed during a said SBW sequence.

* * * * *